United States Patent
Mühlbauer

(10) Patent No.: US 6,443,701 B1
(45) Date of Patent: Sep. 3, 2002

(54) BLADE ROOT FOR PROPELLER AND ROTOR BLADES

(75) Inventor: Gerd Mühlbauer, Rain (DE)

(73) Assignee: Mühlbauer Luftfahrttechnik GmbH, Rain (DE)

( * ) Notice: Subject to any disclaimer, the term of this patent is extended or adjusted under 35 U.S.C. 154(b) by 0 days.

(21) Appl. No.: 09/491,472

(22) Filed: Jan. 26, 2000

(30) Foreign Application Priority Data

Jan. 29, 1999 (DE) .............................................. 19903550

(51) Int. Cl.$^7$ ................................................. B64C 11/26
(52) U.S. Cl. ....................................... 416/230; 416/248
(58) Field of Search ............................ 416/229 R, 230, 416/241 R, 248, 153, 239

(56) References Cited

U.S. PATENT DOCUMENTS

| | | | |
|---|---|---|---|
| 2,182,812 A | * 12/1939 | Lougheed | .................... 416/230 |
| 2,240,873 A | * 5/1941 | Thomas | ...................... 416/230 |
| 3,734,642 A | * 5/1973 | Dixon | ......................... 416/239 |
| 3,792,937 A | * 2/1974 | Chilman | ..................... 416/153 |
| 4,407,635 A | 10/1983 | Grimes et al. | |
| 4,789,304 A | * 12/1988 | Gustafson et al. | .......... 416/230 |
| 4,921,403 A | * 5/1990 | Poucher et al. | ............. 416/147 |
| 5,118,256 A | * 6/1992 | Violette et al. | ............. 416/239 |
| 5,795,132 A | * 8/1998 | Wheeler | ...................... 416/147 |

FOREIGN PATENT DOCUMENTS

| | | |
|---|---|---|
| DE | 37 38216 | 6/1989 |
| EP | 0 324 617 | 7/1989 |
| GB | 1319235 | 7/1969 |
| GB | 2 244 525 | 12/1991 |

* cited by examiner

Primary Examiner—F. Daniel Lopez
Assistant Examiner—Igor Kershteyn
(74) Attorney, Agent, or Firm—Collard & Roe, P.C.

(57) ABSTRACT

A blade root for propeller and rotor blades made of fiber-reinforced composite material, for arrangement in propeller or rotor hubs of aircraft, ground effect vehicles, wind power generators or blowers with adjustable or variable pitch. The blade root comprises a parted blade ferrule and a basic body, so that the blade body is arranged between the basic body and the blade ferrule. The inner surface of the blade ferrule has a first, upper cylindrical segment, a second segment with a smaller diameter adjoining the first segment and being curved inwardly toward the longitudinal axis of the blade root, and a third segment with a larger diameter adjoining the second segment and extending outwardly. The blade ferrule is joined with the blade body by gluing. The parted blade ferrule is held together with two high strength rings, press-fit onto the ferrule. A pitch change pin is press-fit through the metal and composite part of the blade root.

6 Claims, 1 Drawing Sheet

Section II-II

BLADE ROOT FOR PROPELLER AND ROTOR BLADES

BACKGROUND OF THE INVENTION

1. Field of the Invention

The invention concerns a blade root made of fiber-reinforced composite material for propeller and rotor blades for propeller or rotor hubs of aircraft, ground effect vehicles, wind-power generators or blowers with adjustable or variable pitch. The blade root comprises a parted blade ferrule and a basic body. The body of the blade is arranged between the basic body and the blade ferrule. For optimal efficiency, the propeller or rotor blades can be adjusted while they are standing still or in operation.

2. The Prior Art

Various blade roots are shown in UK Patent No. GB 13 19 235; German Patent No. DE 38 216; European Patent No. 0 324 617; and U.S. Pat. No. 4,407,636. These blade roots are generally used with aircraft propellers having blades made of fiber-reinforced composite material. However, such blade roots are not limited to these fields of application. Propellers with blades consisting of fiber-reinforced composite material are increasingly replacing blades consisting of light metal or a wood composite to reduce the weight and increase the operational strength.

A blade root construction for adjustable propeller blades made of fiber-reinforced composite material of the type mentioned above is known from UK Patent No. GB 13 19 235, in which the blade root has a parted blade ferrule for securing it on a propeller hub. The blade ferrule is secured on the blade root with a screw bolt, that extends through the bottom of the blade ferrule into a basic body in the blade root.

This construction has the disadvantage that the flange at the lower end of the parted blade ferrule is clamped between a flange on the bottom end of the basic body and a ring. The required clamping force is increased by the screw bolt, which can be screwed into the basic body. This weakens the basic body and may result in local stress peaks leading to destruction of the blade root and loss of the blade. The screw bolt may also become loose, which leads to a reduction of the initial preload and premature failure of the screw connection. Furthermore, a locally increased surface contact pressure ensues between the flange of the parted blade ferrule and the flange of the basic body, which reduces the operational strength as well.

A blade root for a propeller made of fiber-reinforced composite is shown in German Patent No. DE 37 38 216, where a one-piece blade ferrule is connected with the body of the blade via screw bolt as well. This connection is also afflicted with the disadvantage that in the event of the screw bolt fails, loss of the blade may occur, resulting in serious operational trouble. Furthermore, the connection between the blade ferrule and the body of the blade may become loose due to the conical shape of the blade root, leading to a reduction in the initial preload of the screw and consequently to premature failure of the screw connection.

European Patent No. 0 324 617 describes a blade body made of fiber-reinforced composite. The lower part of the blade body has a cylindrical blade root, and a one-piece blade ferrule arranged on top of the blade root. The operational strength is obtained via the connection of the cylindrical part of the blade root with a wedge-shaped widening of the diameter, which is supported by an inner flange bushing. The blade body is thus prevented from moving out of the blade ferrule, which otherwise may be possible. This construction, however, is very complicated and requires a large production engineering expenditure, and is consequently costly. Since the connection between the blade root and the blade ferrule is mainly produced by gluing, there is the risk that if the connection becomes disengaged, the blade body will twist, resulting in different propeller blade angles and dangerous operational failure.

No provision for an outer blade ferrule is made in connection with the construction disclosed in U.S. Pat. No. 4,407,635, which means the blade bearing rests directly on the fiber reinforced composite material of the blade root. This decreases the operational strength because the blade root is in direct contact with the lubricant of the blade bearing. This means that chemical reactions may occur that may lead to weakening of the composite matrix of the body of the blade. In addition, the fiber-reinforced composite blade root has to be reinforced with a ring consisting of radially oriented rovings of composite fibers, which substantially increases the manufacturing expenditure.

SUMMARY OF THE INVENTION

It is therefore an object of the invention to avoid the disadvantages of the prior art, and to provide a blade root that eliminates the need for a screw connection between the blade ferrule and the body of the blade.

This and other objects of the invention are accomplished by a blade root for propeller and rotor blades, comprising a parted blade ferrule and a basic body, with the body of the blade being arranged between the basic body and the blade ferrule. The inner surface of the blade ferrule has a first, upper cylindrical segment, which is adjoined by a second segment with a smaller diameter. The second segment is curved inwardly in the direction of the longitudinal axis of the blade root. There is a third segment adjoining the second segment, and has a larger diameter and extends outwardly. The blade ferrule is glued to the fiber-reinforced composite blade body.

The blade ferrule is designed as a parted metal part, which simplifies the manufacture of blade roots for propeller and rotor blades consisting of fiber-reinforced composite, because the blades can be manufactured without blade ferrules up to last production step, so that damage to the surface of the blade ferrule is avoided. Such damage could lead to a poor fit of the blade bearing, or to leaks.

The blade ferrule consists of steel, aluminum, titanium, or an alloy of these materials. Such a material is lightweight but sufficiently strong. The blade bearing rests on the metal of the blade ferrule and not on the fiber composite of the body of the blade. Furthermore, mechanical working of the surface of the blade body on the blade root section on which the blade ferrule is seated, is possible in order to achieve superior precision fit of the blade ferrule. Since the parted blade ferrule is glued to the finished blade root, it is also possible to obtain a perfect form-locked joint. Furthermore, the blade ferrule can be removed inexpensively to expose the part of the blade root that is subject to the highest stresses.

In a preferred embodiment, the halves of the blade ferrule are formed without any gap between them and are connected with one another via two high strength clamping rings. The gap-free design of the blade ferrule assures an optimal fit. The clamping rings, particularly the outer clamping ring, not only mount the halves of the blade ferrule but also secure fly-weights. Fly-weights are required for propellers for acrobatic aircraft or multi-engine airplanes in order to reverse the natural pitch change forces of the propeller blades in the direction of a fine pitch.

Because the third segment has a flange that abuts the lower segment of the body of the blade, a form-locked or positive connection is obtained between the blade ferrule and the blade body in addition to the nonpositive connection achieved by gluing. This form-locked or positive connection increases the strength of the blade root construction.

According to a preferred embodiment of the invention, a pitch change pin is arranged through the flange for transmitting pitch change forces to the blade body. The pitch change pin extends through the basic body, the blade body and the blade ferrule parallel with the longitudinal axis of the blade root.

This pitch change pin acts as a safety element for preventing the blade body from twisting against the blade ferrule. Preferably, the bore for the pitch change pin is produced only during the final assembly stage of the propeller, which means the position of the pitch change pin can be freely selected depending on the application. This reduces the need to stock the blades because the position of the pitch change pin does not have to be fixed during manufacturing.

The pitch change pin is preferably designed as a press-fit cylinder pin. This is a simple, inexpensive construction that can be carried out readily on the finished blade root.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
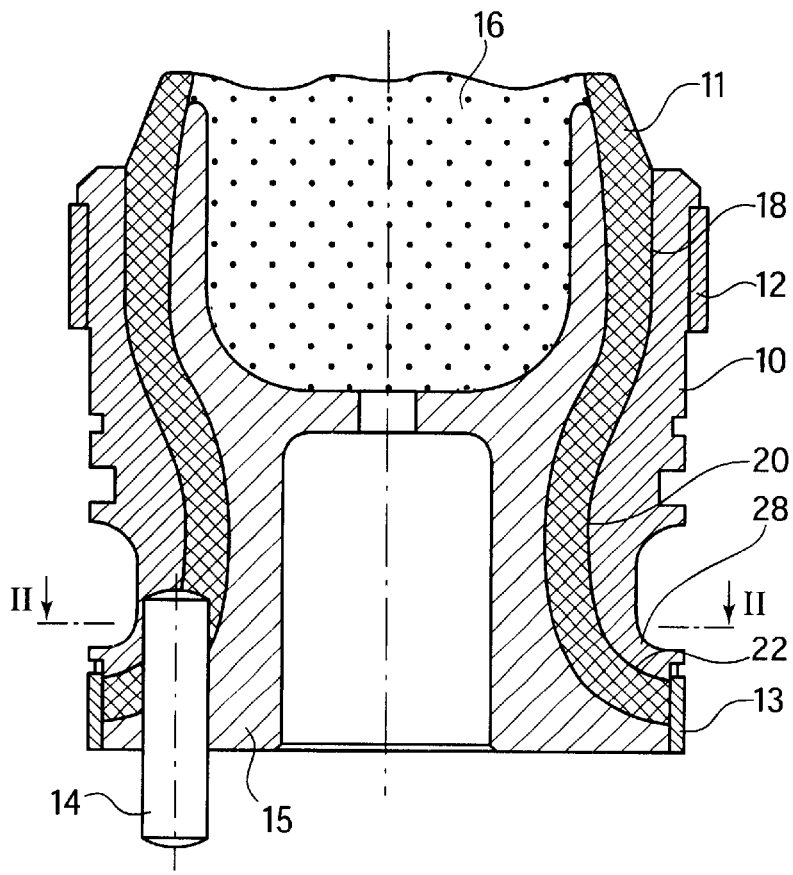
FIG. 1 shows a cross sectional view of the blade root according to the invention.
Figure 2:
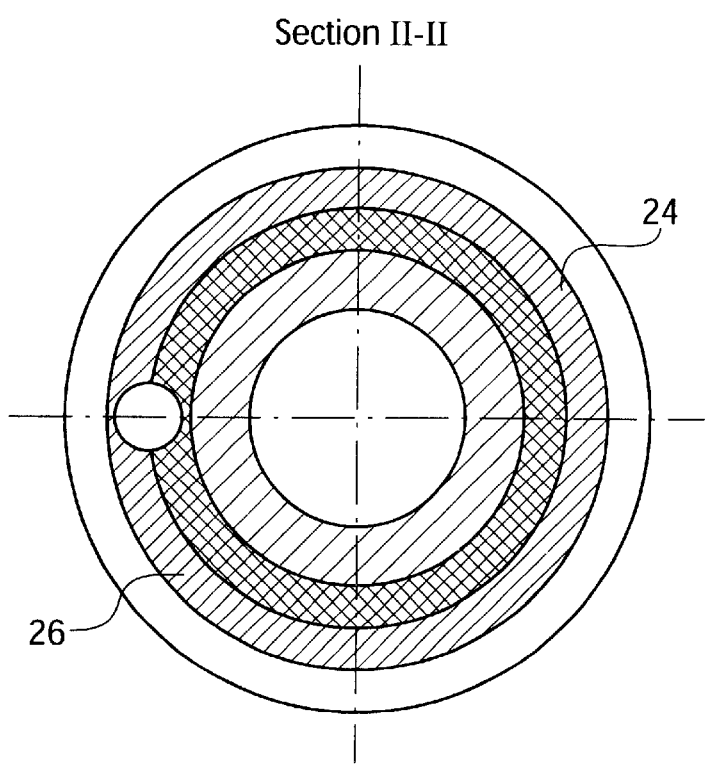
FIG. 2 is a top view of the blade root along lines II—II of FIG. 1.

Referring now in detail to the drawings, FIGS. 1 and 2 show a parted, jointless blade ferrule 10 consisting of two blade ferrule halves 24 and 26. Blade ferrule 10 is made of steel, aluminum, titanium, or alloys of these materials. The blade root also comprises a basic body 15 made of metal, the top section of which receives the foamed plastic core 16 of the blade body 11. The fiber-reinforced plastic blade body 11 is arranged between the blade ferrule 10 and the basic body 15. The inner surface of the blade ferrule 10 has a first, upper cylindrical segment 18, a second segment 20 adjoining the first segment and having a smaller diameter and being curved inwardly toward the longitudinal axis of the blade root, and a third segment 22 with a larger diameter adjoining the second segment and extending outwardly. Third segment 22 is joined with the blade body 11 by gluing.

On the outer side of blade ferrule 10, there are two high strength clamping rings 12, 13 for mounting the two blade ferrule halves 24, 26. The third, outwardly extending segment 22 of the blade ferrule 10 has a flange 28 that abuts the flange on the lower section of the blade body 11. An pitch change pin 14 for transmitting the pitch change forces of the adjusting device to the blade body 11 is arranged through flange 28, and extends parallel with the longitudinal axis of the blade root through the basic body 15, the blade body 11, and up into the blade ferrule 10. In this way, the pitch change pin further secures the construction against twisting of the blade ferrule 10 against the blade body 11. The pitch change pin is designed as a cylinder pin. However, it may have any other useful form as well. The pin is secured in the blade root in a suitable manner, such as by a press fit and/or gluing. The outer surface of the blade ferrule 10 has recesses or grooves for receiving bearings and seals. The shape of blade body 11 and basic body 15 is adapted to the shape of the inner surface of the blade ferrule 10.

The blade root as defined by the invention eliminates the need for a screw connection and thus avoids the disadvantages associated with such a connection, and provides a safe, inexpensive construction with a long useful life.

Accordingly, while only a single embodiment of the present invention has been shown and described, it is obvious that many changes and modifications may be made thereunto without departing from the spirit and scope of the invention.

What is claimed is:

1. A blade root for propeller and rotor blades having blade bodies made of fiber-reinforced plastic for arrangement in propeller or rotor hubs, comprising:

a parted blade ferrule having an inner surface comprising:
(a) a first, upper cylindrical segment;
(b) a second segment adjoining said first segment, said second segment being curved inwardly toward a longitudinal axis of the blade root and having a smaller diameter than said first segment; and
(c) a third segment adjoining said second segment and extending outwardly and having a larger diameter than said second segment; and a basic body disposed within the blade ferrule, wherein one of the blade bodies is secured to the blade root by mounting the blade body between the basic body and the blade ferrule, and gluing the blade body to the blade ferrule;

wherein the shape of the blade body and said basic body is adapted to the shape of said inner surface of said blade ferrule.

2. The blade root according to claim 1, wherein the blade ferrule is made from a material selected from the group consisting of steel, aluminum, titanium, and alloys thereof.

3. The blade root according to claim 1, wherein the blade ferrule comprises two halves that are formed without a gap between them and are connected with one another by two high strength clamping rings.

4. The blade root according to claim 1, wherein the third segment has a flange that abuts a lower section of the blade body when the blade body is mounted to the blade root.

5. The blade root according to claim 4, further comprising a pitch change pin for transmitting pitch adjusting forces to the blade body mounted to the blade root, said pin being arranged through the flange of the basic body, the blade body and the ferrule and is parallel with a longitudinal axis of the blade root.

6. The blade root according to claim 5, wherein the pitch-change pin is a press-fit cylinder.

* * * * *